United States Patent [19]

Matsumae et al.

[11] Patent Number: 5,078,929
[45] Date of Patent: Jan. 7, 1992

[54] PROCESS OF DEBINDING CERAMIC PRODUCTS

[75] Inventors: Toshiyuki Matsumae, Neyagawa; Yoichi Yamamoto, Yawata; Isao Fuwa, Kadoma, all of Japan

[73] Assignee: Matsushita Electric Works, Ltd., Japan

[21] Appl. No.: 457,153

[22] Filed: Dec. 26, 1989

[51] Int. Cl.$^5$ ............................................. C04B 35/64
[52] U.S. Cl. ................................... 264/40.1; 264/63; 264/64; 264/344
[58] Field of Search ................... 264/63, 64, 40.1, 344

[56] References Cited

U.S. PATENT DOCUMENTS 4,795,598 1/1989 Billiet ..................... 264/63

FOREIGN PATENT DOCUMENTS 61-163172 7/1986 Japan .
62-7674 1/1987 Japan .

*Primary Examiner*—James Derrington
*Attorney, Agent, or Firm*—Stevens, Davis, Miller & Mosher

[57] ABSTRACT

A process of debinding a ceramic product utilizes a furnace for heating the ceramic product therein in the presence of a surrounding gas so as to remove an organic binder contained in the ceramic product. The ceramic product is continuously heated to an elevated temperature during which the organic binder is decomposed to generate a cracked gas. The process monitors the condition of the cracked gas and controls, depending upon the monitored condition, to vary a temperature gradient at which the ceramic product is heated and at the same time to vary an amount of the surrounding gas being supplied to the furnace in such a manner as to remove the organic binder successfully from within the ceramic product without leaving any unacceptable defect therein.

9 Claims, 9 Drawing Sheets

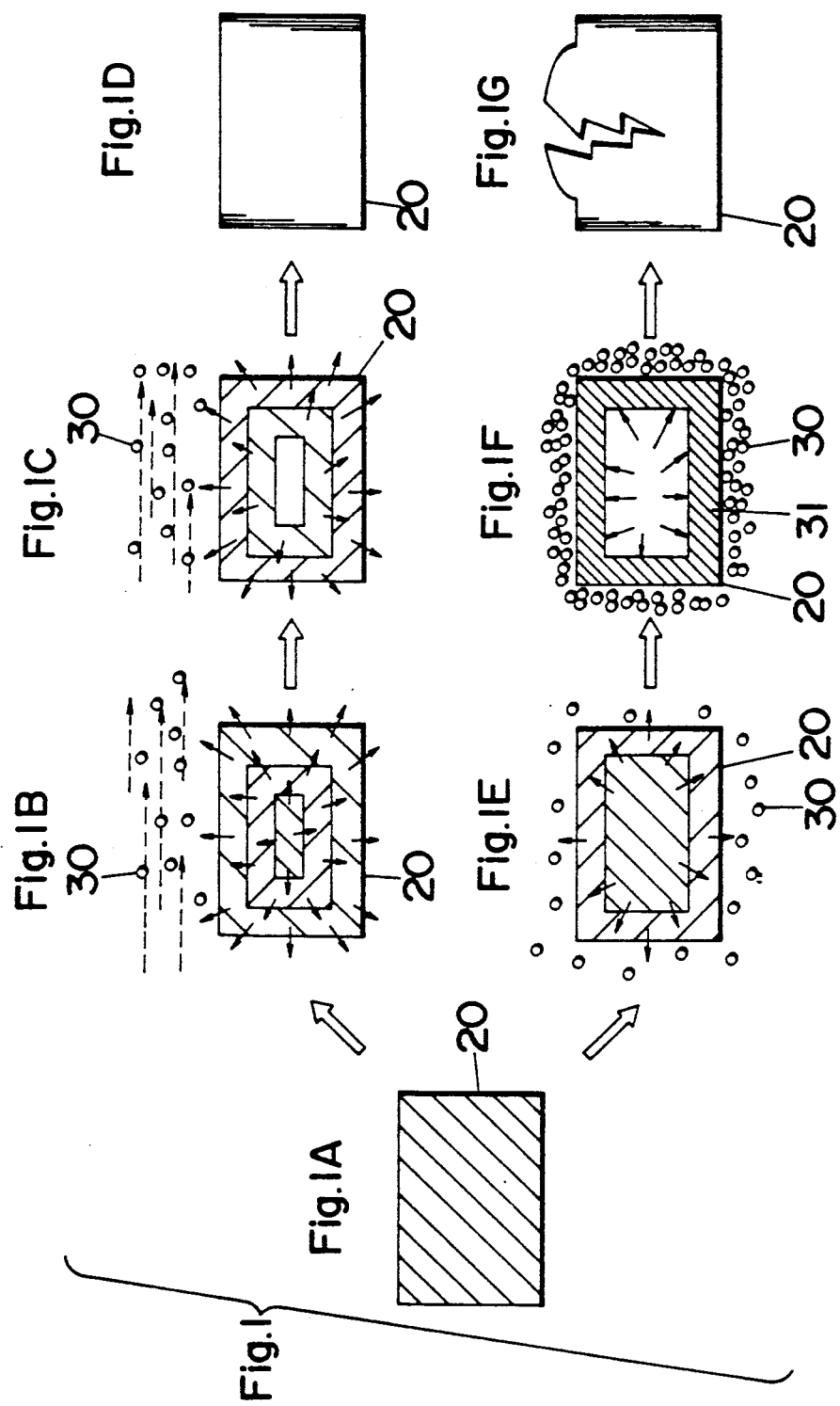

PROCESS OF DEBINDING CERAMIC PRODUCTS

BACKGROUND OF THE INVENTION

1. Field of the Invention

The present invention is directed to a process of debinding ceramic products, and more particularly to a process of removing an organic binder contained in the ceramic products by heating the same within a furnace at the presence of a surrounding gas.

2. Description of the Prior Art

In general, ceramics products are formed by baking a mixture of ceramic powders and an organic binder which is added to impart plasticity or fluidity to the mixture for facilitating the ceramic products in press, extrusion, injection molding, and various other forming method. In particular, the injection molding is mostly preferred to form ceramic products into complicated shapes. The injection molding requires high fluidity and therefore more amount of the organic binder to be mixed with the ceramic powders. However, the excess amount of organic binder will impair the finished ceramic product and should be therefore removed after the forming of the ceramic product. Although the ceramic product can be removed of the organic binder by sintering at which the organic binder is vaporized to be flown outwardly of the ceramic product. However, the heat-treatment should be carefully controlled in order to avoid cracking, flaking, or fracture of the ceramic product. In fact, when the ceramic product is heated too excessively or abruptly, the organic binder within the produce is rapidly decomposed to generate the cracked gas in an excess amount per unit time to thereby increase an internal gas pressure within the ceramic product to such an extent as to cause the swelling of the product, which eventually results in the cracking or flaking in the surface of the products or even in the fracture.

To avoid the occurrence of such defects during the heat-treatment, there have been conventionally proposed to control the temperature of the furnace in a feed back manner in accordance with a predetermined program by monitoring the furnace temperature. Such prior process is disclosed in Japanese patent early publication (KOKAI) No. 61-163172 in which a control is made to vary the furnace temperature in accordance with a monitored change in the weight of the ceramic product, and in Japanese early publication (KOKAI) No. 62-7674 in which a control is made to vary the furnace temperature based upon a monitored change in concentration of a particular component of the cracked gas.

However, because of the finding that the amount of the cracking gas of the organic binder is not directly related to the temperature, the above prior temperature control alone is not effective in preventing the generation of excess amount of the cracked gas and fail to achieve desired defect-free debinding of the product. In fact, it is found that the generation of the cracked gas can be well controlled by varying the amount of the surrounding gas being supplied to the furnace per unit time, or flow rate of the surrounding gas, in addition to varying the furnace temperature. As seen in FIGS. 1A to 1G which schematically illustrate the process of debinding a ceramic product 20, when the surrounding gas is supplied in a proper amount or at a proper flow rate around the product 20, the cracked gas 30 emerging from the product 20 is diffused in the surrounding gas and carried thereon to be expelled out of the furnace, thereby allowing the cracked gas to continuously escape from the product 20 (shown in FIGS. 1A to 1D). On the other hand, when the surrounding gas is supplied in a less amount or at a less flow rate, it will be soon saturated with the cracked gas emerging from the product 20 which in turn retards the cracking of the organic binder in the surface layer 31 of the product 20 such that the organic binder becomes tarry or solidified to thereby inhibit the escape of the cracked gas or the organic binder from within the product 20 (FIGS. 1A to 1G). With this result, the internal gas pressure of the product is unduly increased to such an extent as to cause the fracture of the product 20 (FIG. 1G). Also, when the surrounding gas is supplied in an excessive amount, the cracked gas will be generated and drawn too rapidly from the outer surface layer of the product, leaving therein voids causing the unacceptable surface flaking.

Further, when air is utilized as the surrounding gas rather than an inert gas for economical reasons, an oxygen concentration of the surrounding air is also found to be an important factor in controlling the generation of the cracked gas during the heat-treatment process. This is because that, as schematically illustrated in FIG. 2A, as the oxygen concentration is increased, the organic binder has its inter-carbon bonds broken at a more number of sites by oxygen (indicated by dotted lines) to thereby generate the cracked gas of a correspondingly lower molecular weight which will occupy a larger volume within the ceramic product. With this result, the internal gas pressure of the cracked gas within the ceramic product is increased to make the product more susceptible to the above defect. When utilizing an inert gas such as nitrogen as the surrounding gas, the organic binder has a less number of breaks (indicated by dotted lines in FIG. 2B) in the inter-carbon bonds to thereby generate the resulting cracked gas of a high molecular weight and therefore occupying less volume within the product, contributing to well inhibiting the occurrence of the above defects. However, in view of the fact that the debinding process requires to continuously flow the surrounding gas around the ceramic product over a relative long period of time and therefore use a large volume of the surrounding gas, the use of the inert gas of relatively expensive nature poses a serious cost problem and therefore should be avoided or minimized.

The above discussion can be more clearly understood from FIG. 3 which is provided to illustrate a change of carbon monoxide [CO] concentration, one component of the cracked gas generated from the organic binder contained in the ceramic product during the process of heating the product in accordance with a predetermined time-temperature curve while supplying the surrounding air at a fixed rate. As apparent from the figure, during the process of controlling the temperature of the ceramic product in this condition of supplying the surrounding air at a fixed rate there occurs an abrupt increase of CO concentration, which is indicative of the development of the defects in the product, at a point not directly related to the temperature. Therefore, it is confirmed that only the temperature control fails to achieve the defect-free debinding of the ceramic product. In the figure, a curve of an oxygen concentration is also shown for reference.

Further, the feed back control of the furnace temperature alone is found to pose another problem that the furnace and the ceramic product is difficult to be heated exactly in an intended manner due to a relatively large heat capacity of the furnace and the ceramic product, and is most likely to suffer from an overshooting of temperature, which is also the cause of the defects in the ceramic product and may make the temperature control itself ineffective for achieving a defect-free debinding of the ceramic product.

SUMMARY OF THE INVENTION

To eliminate the above problems, the present invention is contemplated to control an environmental condition of a ceramic product being heated within a furnace, in addition to controlling the furnace. In a ceramic product debinding process of the present invention, the ceramic product is placed in the furnace and is heated at an increasing temperature gradient in the presence of a surrounding gas being supplied to and discharged from the furnace for removing an organic binder contained in the ceramic product. The process constantly monitors the condition of the ceramic product being heated and controls the flow rate of the surrounding gas as well as the furnace temperature in order to remove the organic binder from the ceramic product in an optimum environment without causing an unacceptable defect in the ceramic product.

Accordingly, it is a primary object of the present invention to provide a ceramic product debinding process which is capable of controlling, depending upon the monitored condition of the ceramic product, the amount of the surrounding gas being supplied to the furnace in addition to the temperature of the furnace for removing the organic binder from the ceramic product in an optimum manner without causing an unacceptable defect.

In a preferred embodiment, a cracked gas generated from the organic binder is monitored as indicative of the condition of the ceramic product being heated. The cracked gas is generated as a result of the organic binder being decomposed under the effect of heat and is therefore generated at a higher rate as the ceramic product is heated to an elevated temperature. Consequently, the concentration of a particular component of the cracked gas is found to be well indicative of the condition of the ceramic product or the debinded extent thereof and provide a consistent basis for control of the environment and the temperature of the ceramic product.

It is therefore another object of the present invention to provide a ceramic product debinding process in which the concentration of a particular component of the cracked gas generated from the organic binder is monitored as indicative of the condition of the ceramic product for properly controlling the debinding process.

Based upon the monitored concentration of the particular component of the cracked gas, the process is controlled to vary the supplying amount of the surrounding gas in order to maintain the particular component concentration at a constant level, thus maintaining the cracked gas to generate at substantially a constant rate and therefore preventing an abrupt outflow of the gas from the ceramic product which would certainly cause a void or defect in the ceramic product.

It is therefore a further object of the present invention to provide a ceramic product debinding process in which the concentration of the particular component of the cracked gas is kept at a predetermined level by controlling the supplying amount of the surrounding gas so as to expel the organic binder in such a steady state not as to leave a defect in the ceramic product.

Air is utilized for economical reasons as the surrounding gas which is required to be constantly supplied and therefore utilized in a greater amount over the debinding process. However, it is known that oxygen in the air acts in the debinding process to cause the defect in the ceramic product since the oxygen reacts with the organic binder being decomposed within the ceramic product to lower the molecular weight of the resulting cracked gas and correspondingly increase the internal pressure of the cracked gas in the ceramic product to such an extent as to leave a void or defect in the product. To avoid such harmful effect of the oxygen, it is contemplated in a preferred embodiment of the present invention to reduce the oxygen concentration to a permissible level when the decomposition of the organic binder becomes intense to such an extent that the oxygen will be likely to react with the organic binder, thereby restraining the undesirable reaction of the oxygen with the organic binder at a minimum for successfully continuing the heat-treatment of the ceramic product without leaving the void or defect in the ceramic product. For the purpose of reducing the oxygen concentration, an additional surrounding gas free from oxygen such as nitrogen or other inert gas is supplied to the furnace. Although the inert gas is relatively expensive, the inert gas is supplied only when the decomposition of the organic binder becomes intense and is stopped being supplied when the decomposition is lessened or made in a moderate state such that the use of the relative expensive inert gas can be kept at a minimum. For control of supplying and stopping the inert gas, the concentration of the particular component of the cracked gas generated by the decomposition of the organic binder is constantly monitored in such a way as to determine that the decomposition becomes intense when the particular concentration of the cracked gas exceeds a predetermined level.

It is therefore a further object of the present invention to provide a ceramic product debinding process which is capable of removing the organic binder successfully without leaving a defect in the ceramic product in an economical manner by mainly using the air as the surrounding gas while retaining the use of an inert gas at a minimum.

The present invention discloses other advantageous features for monitoring the condition of the ceramic product being heated. For example, a change in transmissivity of light passing through the cracked gas is examined in view of the fact that the transmissivity will decrease as the cracked gas is generated at an increased rate and therefore as the ceramic product is removed of the organic binder to a greater extent.

Another scheme effective for monitoring the condition of the ceramic product being heated is to place a reflector in the furnace so that the cracked gas will deposit on the reflector, and to examine a reflectance of the light from the reflector as the function of the amount of the cracked gas generated and therefore as indicative of the debinded extent of the ceramic product.

Further, a color change of the ceramic product may be examined as indicative of the debinded extent of the ceramic product. For this purpose, yellowness of the ceramic product determined from suitable tristimulus values is selected for evaluation of the debinded extent of the ceramic product.

It is therefore a still further object of the present invention to provide a ceramic product debinding process in which the debinded condition of the ceramic product can be reliably monitored for effecting a consistent control of the process.

The above and still other objects and advantages will become more apparent from the detailed description of the following embodiments when taken in conjunction with the attached drawings.

BRIEF DESCRIPTION OF THE DRAWINGS

FIG. 1, composed of FIGS. 1A to 1G, is a diagram schematically illustrating removal of an organic binder from a ceramic product in differing environmental conditions;

DETAILED DESCRIPTION OF THE PREFERRED EMBODIMENTS

A ceramic product which is to be debinded or removed of an organic binder is shaped from a mixture of suitable ceramic powders and the organic binder such as by injection molding or other molding technique. The ceramic power, although not in a limited sense, includes partially stabilized zirconia, alumina, mullite, cordierite, ferrite, and oxides of nonmetallic materials, and the organic binder includes stearic acid, paraffin, butyl acetate, copolymer of ethylene and vinyl acetate, methacrylic acid butyl ester, dibutyl phthalate, polyester or the combination of two or more of the above. The ceramic product, which is debinded in the following embodiments, is formed from the mixture of 55 vol % of partially stabilized zirconia and 45 vol % of an organic binder prepared from 5% by weight of stearic acid, 15% of paraffin, 40% of copolymer of ethylene and vinyl acetate, and 40% of methacrylic acid butyl ester, although the present invention should not be understood to be limited only to the particular ceramic product.

First embodiment

Figure 2A:
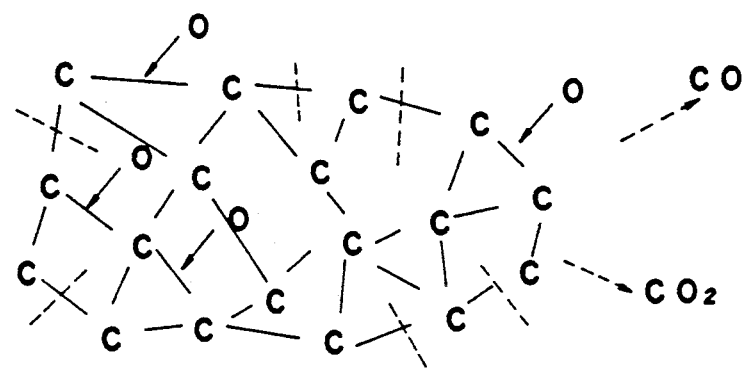
FIG. 2A is a diagram illustrating a mechanism in which the organic binder is broken at their inter-carbon bonds by oxygen into cracked gas of a low molecular weight.
Figure 2B:
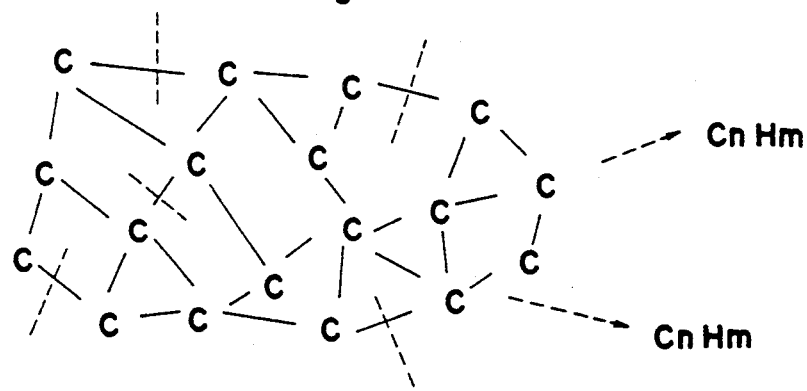
FIG. 2B is a diagram illustrating a mechanism in which the organic binder is broken at their inter-carbon bonds in the presence of an inert gas into cracked gas of a high molecular weight.
Figure 3:
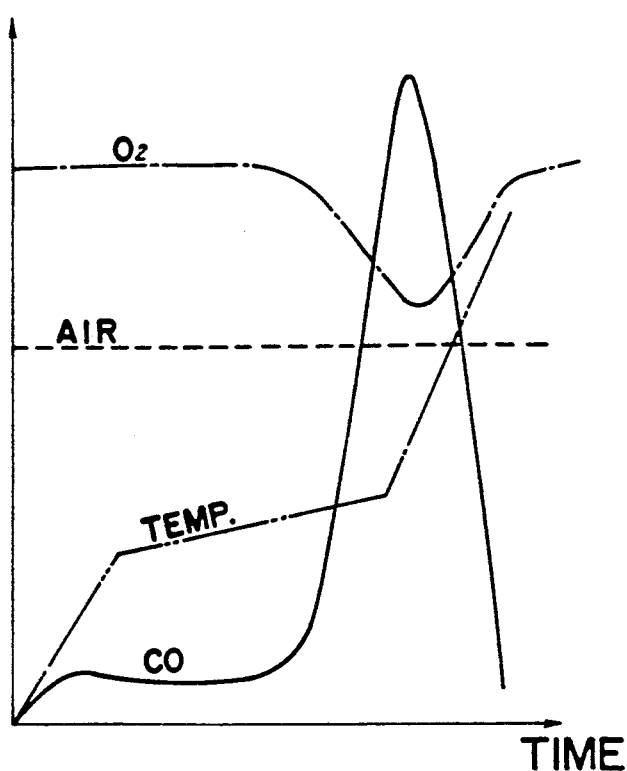
FIG. 3 is a graphic representation of changes in temperature and other environmental parameters generally seen in a prior debinding process of only controlling furnace temperature.
Figure 4:
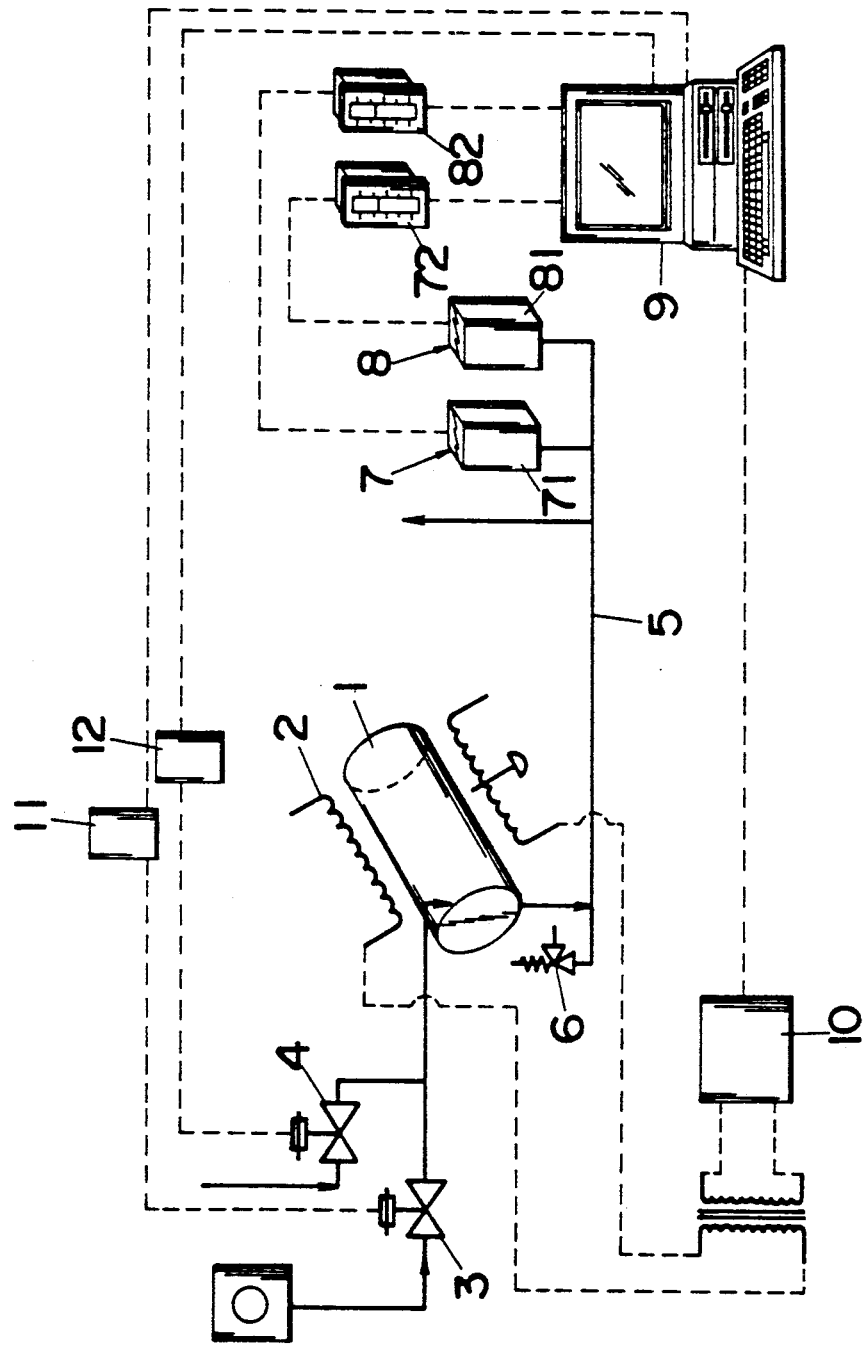
FIG. 4 is a schematic view of a system configuration for debinding a ceramic product in accordance with a first embodiment of the present invention.

Referring now to FIG. 4, there is shown a system for debinding a ceramic product in accordance with a first embodiment of the present invention. The system comprises a furnace 1 in which the ceramic product is placed. The furnace 1 is provided with a heater 2 for heating the ceramic product so as to remove an organic binder contained in the ceramic product in the presence of a surrounding gas. Inlet valves 3 and 4 are provided respectively for supplying air and inert gas such as nitrogen into the furnace 1 to form the surrounding gas which is to be constantly discharged from the furnace 1 through an outlet line 5 with a stop valve 6. The outlet line 5 is also provided with a CO sensor 7 for sensing a concentration of carbon monoxide (CO) in a cracked gas generated from the organic binder and carried on the discharge gas and with an oxygen sensor 8 for sensing a concentration of oxygen in the surrounding gas being discharged. These sensors 7 and 8 are illustrated in the figure to be each composed of a probe 71, 81 and an output section 72, 82. The outputs of the sensors 7 and 8 are fed to a control computer 9 which in turn controls to vary opening amounts of the inlet valves 3 and 4 upon the monitored CO and O2 concentrations for controlling the supplying amount of the air and nitrogen or the flow rate thereof. The inlet valves 3 and 4 are driven by individual actuators 11 and 12 which are coupled through suitable interfaces to the computer 9. The computer 9 is also connected to the heater 2 through a thyristor 10 so as to control the temperature within the furnace 1 in a predetermined manner or in accordance with a temperature-time curve programmed and stored in the computer 9.

The operation of the system will be now discussed. Initially, the system controls to raise the temperature of the furnace 1 at a high rate, while supplying only the air at a constant flow rate in order to heat the ceramic product in the presence of the air. As the ceramic product is heated, the organic binder contained in the ceramic product will begin decomposed to generate a cracked gas including carbon monoxide (CO) to thereby increase a CO concentration. When the ceramic product is heated further to an elevated temperature, the decomposition of the organic binder will be more predominant or made intense to thereby increase the CO concentration to a further extent. When the CO concentration is detected to exceed a predetermined critical level, the computer 9 responds to lessen the opening amount of the valve 3 so as to reduce the amount of the air for lowering the oxygen concentration, while at the same time to open the valve 4 for supplying the inert gas into the furnace 1 in such a manner as to compensate for the decrease in the air supply and to increase a total amount of the air and the inert gas supplied as the surrounding gas at a suitable flow rate. At this occurrence, the heater 2 is also controlled in order to increase the temperature of the furnace 1 at a lowered or moderate rate. The above proportioning of the air and the inert gas is made for lowering the oxygen concentration to an allowable level in a feedback manner by constantly monitoring the oxygen concentration by the sensor s and is continued until the CO concentration is decreased to an allowable level which may be equal to or different from the above-mentioned critical level.

With this mode of control, it is possible to avoid an abrupt increase of the CO concentration which would retard the escape of the cracked gas from within the ceramic product and therefore be the cause of leaving a defect in the product. That is, as soon as the CO concentration is detected to exceed the critical level, the system acts to refresh the surrounding gas by increasing the supplying amount thereof to rapidly remove the cracked gas away from the surface of the ceramic product, facilitating to draw the cracked gas out of the ceramic product thus successfully preventing the ceramic product from being swelled by the entrapped gas. It is noted at this time that, the oxygen which is rich in the initial stage of the heat-treatment, the oxygen can react with the organic binder being decomposed in the surface region of the ceramic product to form therein a resulting cracked gas of a low molecular weight which will occupy a rather large volume and form a correspondingly larger route in the surface region, facilitating the escape of the cracked gas to be generated subsequently in the inner region of the ceramic product and therefore preventing the occurrence of defects in the inner portion of the ceramic product.

Nevertheless, the oxygen concentration is controlled to decrease upon detection of the CO concentration exceeding the critical level by decreasing the supplying amount of the air and by increasing the supplying amount of the inert gas. Whereby, in the subsequent heat-treatment of the ceramic product where the decomposition of the organic binder becomes more intense within the ceramic product, the organic binder being decomposed can be inhibited from reacting the oxygen and therefore restricted from forming the cracked gas of a low molecular weight which would certainly increase the internal gas pressure within the ceramic product and therefore result in unacceptable swelling or fracture of the ceramic product. This effect is further enhanced by the fact that the decomposition of the organic binder is restricted to some extent as a result of that the temperature of the product is lowered by exposition to the increased amount of the surrounding gas supplied to the furnace in response to the CO concentration exceeding the critical level.

In the above embodiment, the air is mainly utilized to form the surrounding gas until the substantial decomposition of the organic binder occurs or the cracked gas is generated at a remarkable rate, while the inert gas is controlled to be supplied to form the inert-gas-rich surrounding gas only when there is seen the critical increase of the cracked gas. Therefore, the total consumption of a relatively expensive inert gas can be maintained at a minimum, thereby enabling the debinding process to be performed economically.

Second embodiment

Figure 5:
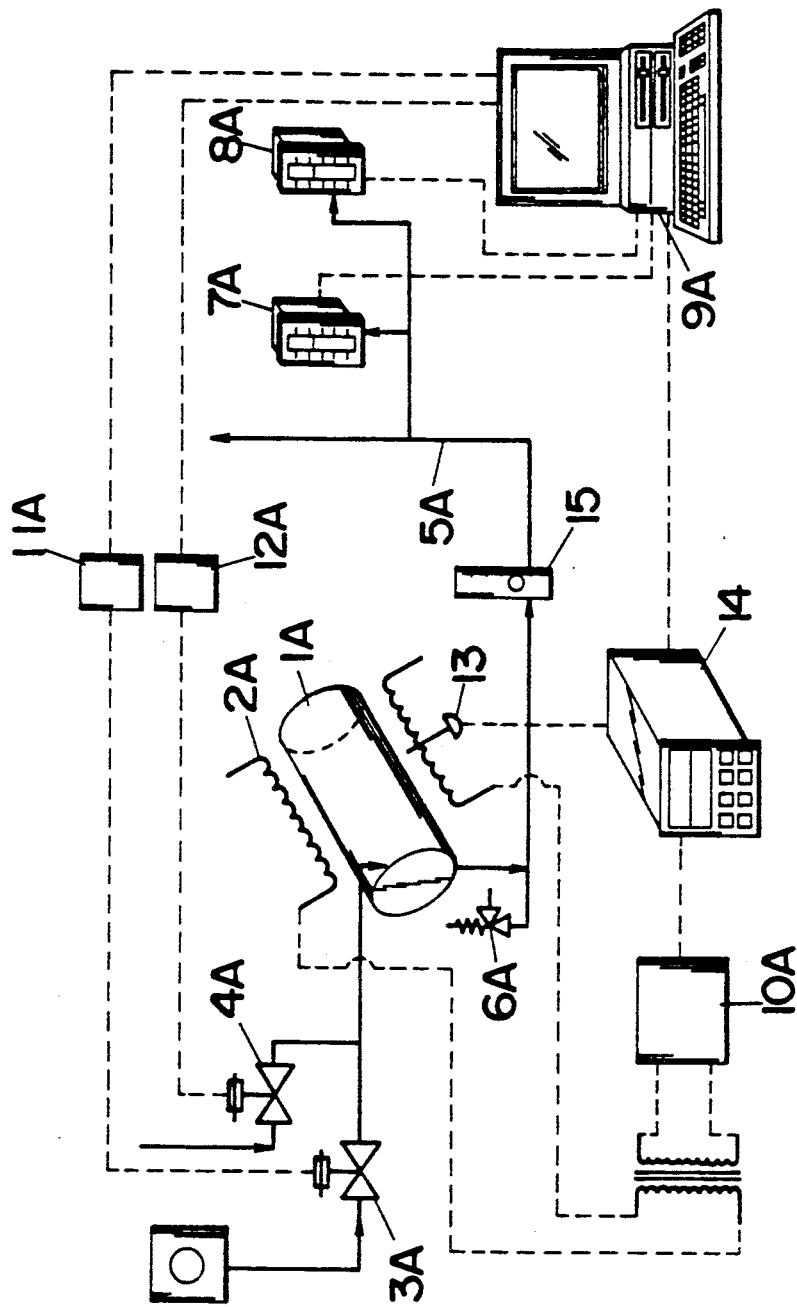
FIG. 5 is a schematic view of a system configuration for debinding a ceramic product in accordance with a second embodiment of the present invention.

FIG. 5 illustrates a system carrying out a debinding process in accordance with a second embodiment of the present invention. The system is identical to the above embodiment except for a feedback control of the furnace temperature. The like components are designated by like numerals with a suffix letter of "A" for an easy reference purpose. A temperature sensor 13 is provided to monitor the temperature of a furnace 1A and to send a corresponding signal to a programmable controller 14 which controls a thyristor 10A under the instruction from a control computer 9A but in consideration of the monitored furnace temperature for energizing a heater 2A to effect the heating in a desired time-temperature pattern. Additionally, an outlet line 5A is provided with an flow meter 15.

Figure 6:
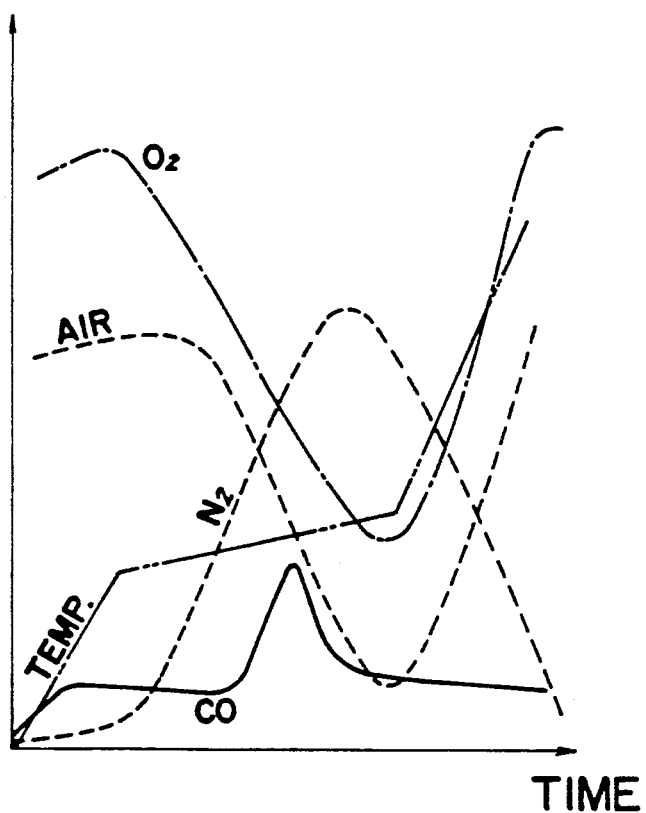
FIG. 6 is a graph showing changes in temperature and other environmental parameters seen in the debinding process of the second embodiment.

Likewise in the above first embodiment, the system is operated to regulate the amounts of the air and the inert gas being supplied to the furnace as the surrounding gas as well as to control the furnace temperature in accordance with the monitored CO and oxygen concentrations, as shown in FIG. 6. As seen in the figure, the furnace temperature is initially controlled to increase rapidly or at a high rate. When the CO concentration is detected to exceeds a critical level, a control is made to lower the increasing rate of the furnace temperature, to lower the flow rate of the air, and to raise the flow rate of the inert gas $N_2$ with attendant decrease in the oxygen concentration in much the same way as in the first embodiment. As the system is thus controlled to continuously remove the organic binder from the ceramic product, the CO concentration will see a peak value followed by a drop down to substantially a constant level. When the debinding proceeds to this stage, the ceramic product is confirmed to be removed almost completely of the organic binder and only a trace amount of the organic binder is assumed to be still present in the ceramic present. With this consequence, the system operates to again raise the supplying amount of the air, lower the supplying amount of the inert gas $N_2$, and heat at a higher temperature increasing rate for completely removing the organic compound without causing any defect in the finished ceramic product. Also in this embodiment, the air is chiefly utilized as the surrounding gas so as to maintain the consumption of the inert gas at a minimum for improved economy.

Third embodiment

Figure 7:
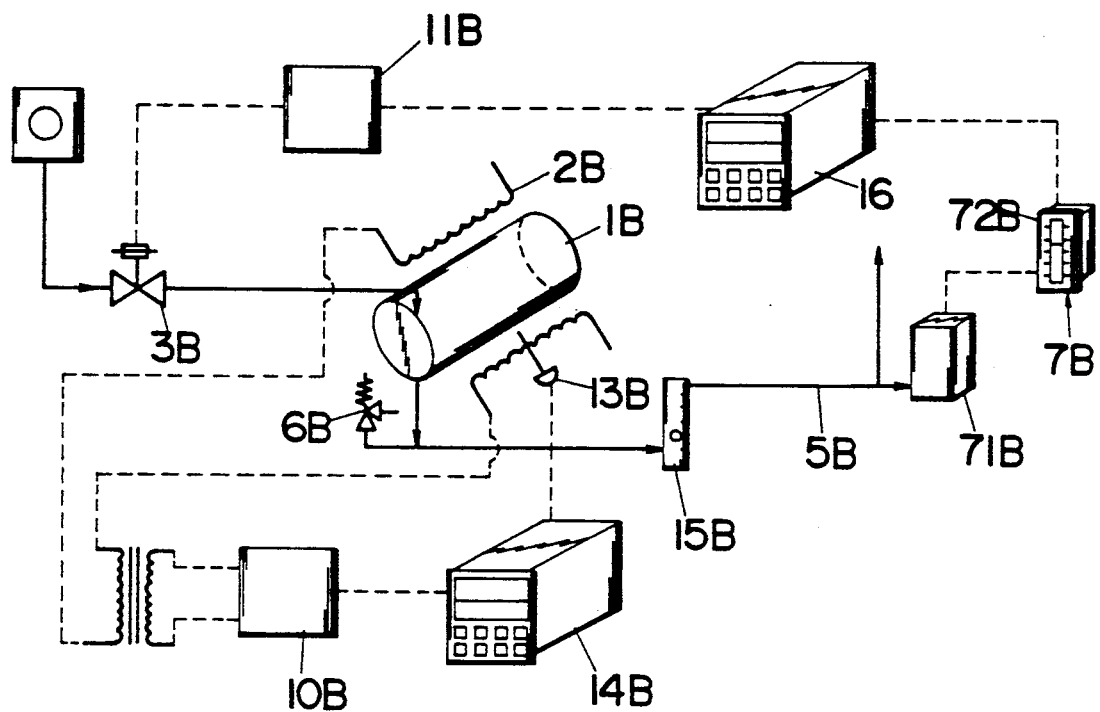
FIG. 7 is a schematic view of a system configuration for debinding a ceramic product in accordance with a third embodiment of the present invention.
Figure 8:
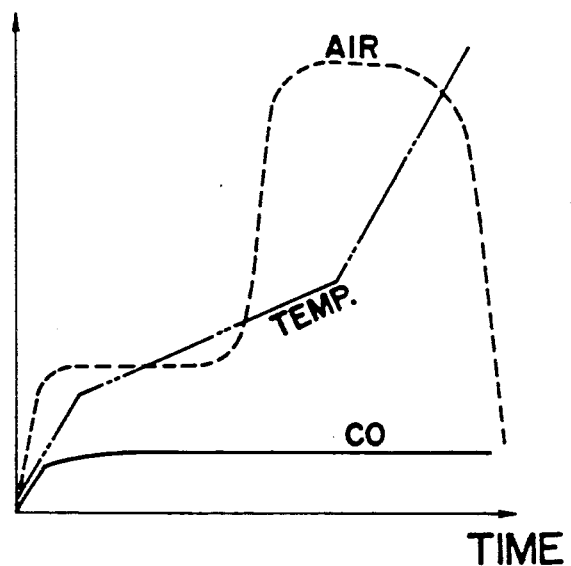
FIG. 8 is a graph showing changes in temperature and other environmental parameters seen in the debinding process of the third embodiment.

FIG. 7 shows a control system in accordance with a third embodiment of the present invention which provides a rather simplified control over the debinding process. The system is configured to supply the air only as the surrounding gas through an inlet valve 3B. Therefore, the valve for the inert gas and the oxygen sensor are eliminated in the present system. The valve 3B is controlled by a programmable controller 16 instead of the control computer as utilized in the previous embodiments to regulate the flow rate or the supplying amount of the air. The other configurations are identical to those of the previous embodiments and therefore like components are designated by like numerals with a suffix letter of "B" for an easy reference purpose. In this system, a heater 2B is controlled according to a predetermined program in a controller 14B and based upon the furnace temperature 1B monitored by a sensor 13B such that the furnace 1B is heated at a high temperature increasing rate until the furnace temperature reaches a first predetermined level, after which it is continuously heated at a low temperature increasing rate up to a second predetermined temperature level and is thereafter heated again at a high temperature increasing rate, as shown in FIG. 8. The supplying amount of the air is regulated in a feedback control based upon the monitored CO concentration of the furnace 1B detected by a CO sensor 7B in order to maintain the CO concentration substantially at a constant level. That is, the supplying amount of the air is rapidly increased at a point where the increasing rate of the CO concentration drops to a lower or negative value, which is indicative of that the decomposition of the organic binder becomes less intense due to the presence of the cracked gas sticking around or in the surface the ceramic product, whereby carrying the cracking gas away from the ceramic product to substantially refresh the surrounding air and again expediting the outflow of the cracked gas from the ceramic product. It is noted at this time that, as shown in FIG. 8, after the furnace temperature is elevated to a high temperature enough to decompose almost all of the organic binder in the ceramic product, the furnace temperature is further heated at a high increasing rate to completely remove the organic binder from the ceramic product without causing unacceptable defects therein. It is confirmed that no substantial defect is found in the finished product also with this simplified control mode.

Although only the CO concentration is monitored as representative of the amount of the cracked gas in the above embodiments, it is equally possible to monitor the concentration of one or more of the other components, for example, carbon dioxide ($CO_2$).

Fourth embodiment

Figure 9:
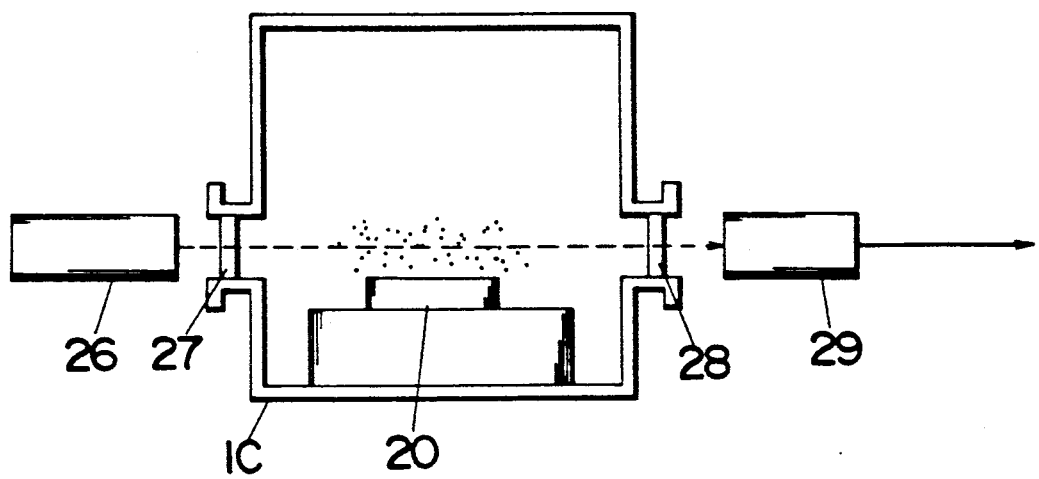
FIG. 9 is a schematic view of a furnace utilized in a debinding process in accordance with a fourth embodiment of the present invention, the furnace provided with a device for monitoring light transmissivity of the cracked gas being generated from the ceramic product.
Figure 10:
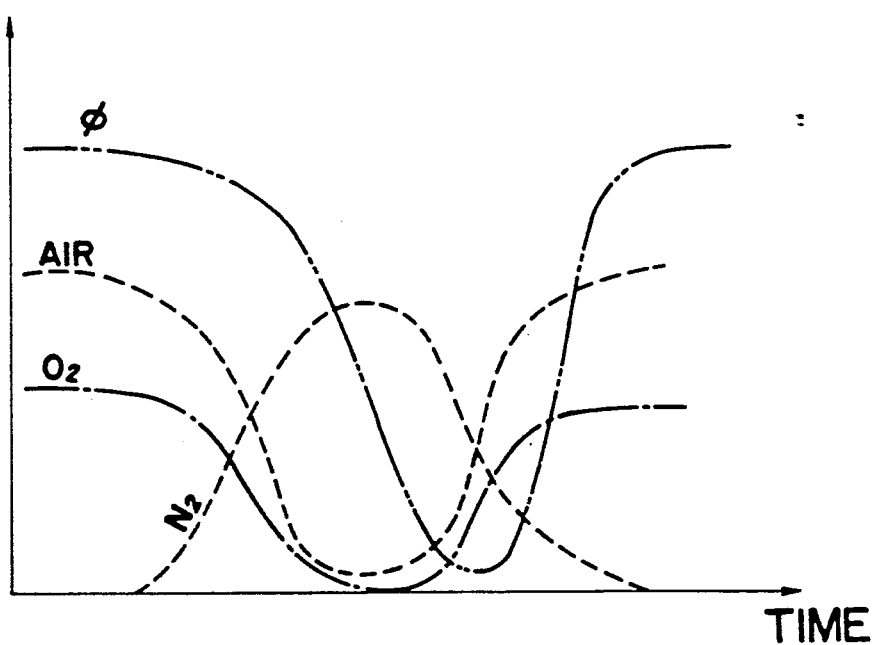
FIG. 10 is a graph showing changes in several environmental parameters seen in the debinding process of the fourth embodiment.

In a forth embodiment of the present invention, the condition of the ceramic product being heated is evaluated in terms of a change in transmissivity of light passing through the surrounding gas. This is based upon the fact that the transmissivity of light will decrease as the cracked gas is generated in an increased amount to have a correspondingly increased CO concentration. As shown in FIG. 9, a furnace 1C utilized in the present embodiment is formed in its opposed walls respectively with sealed windows 27 and 28. A light source 26 and a photo-sensor 29 are disposed outside of the windows 27 and 28 so that the photo-sensor 29 will receive a light emitted from the source 26 and passing through the surrounding gas immediately adjacent a ceramic product 20 for examining the change in transmissivity of light. The light source 26 is preferably of a type emitting a He-Ne laser beam. The output of the photo-sensor 29 is fed to a computer consisting a like control system of FIGS. 4 or 5 so that the computer can control the furnace temperature as well as the supplying amounts of the air and the inert gas based upon the monitored light transmissivity. As shown in FIG. 10, when the light transmissivity $\phi$ decreases to a certain level which indicates that the decomposition of the organic binder becomes too intense to successfully continue the removal of the organic binder, a control is made to decrease the supplying amount of the air and instead to increase the inert gas, i.e., nitrogen in the like manner as in the first and second embodiments to continue the heat-treatment of the ceramic product at an optimum environment for completely removing the organic binder from the ceramic product without leaving a defect therein. FIG. 10 also shows the oxygen concentration of the surrounding gas which varies in proportion to the supplying amount of the air.

Fifth embodiment

Figure 11:
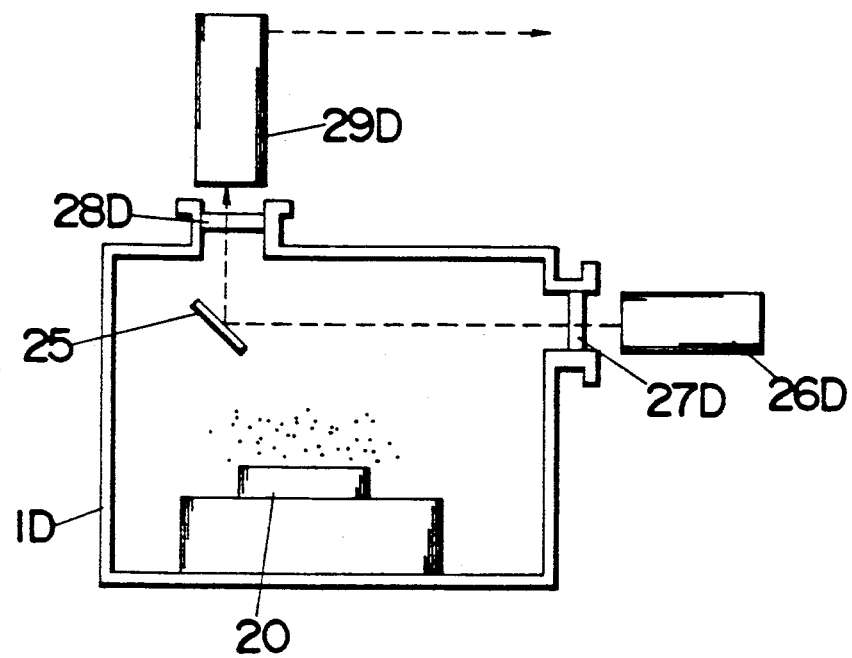
FIG. 11 is a schematic view of a furnace utilized in a debinding process in accordance with a fifth embodiment of the present invention, the furnace provided with a device for monitoring reflectance of light from a reflector disposed within the furnace.
Figure 12:
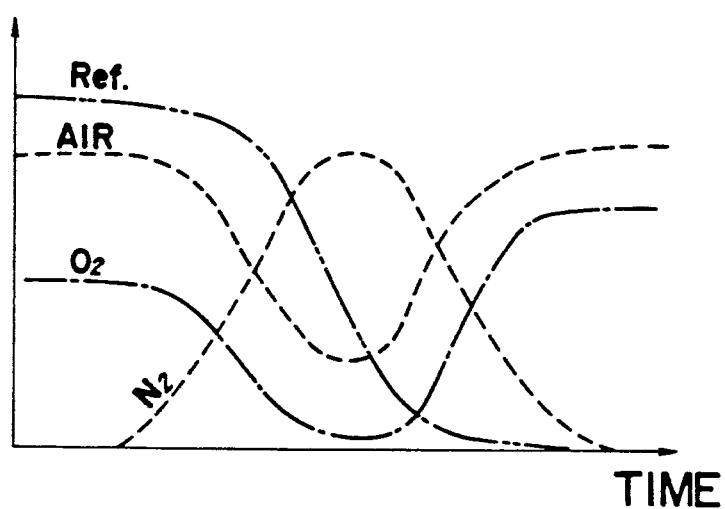
FIG. 12 is a graph showing changes in several environmental parameters seen in the debinding process of the fifth embodiment.

A fifth embodiment of the present invention is contemplated to monitor the condition of the ceramic product being heated in terms of reflectance of light from a reflector 25 disposed within a furnace 1D, as shown in FIG. 11. The reflector 25 is surrounded by a water jacket (not shown) to be kept at a temperature of 50° C. such that the cracked gas generated in the furnace 1D can be cooled by contact with the reflector 25 and coagulate to adhere on the reflector. When this occur, the reflectance is considerably lowered and therefore can be well indicative of the debinded extent of the ceramic product. For monitoring the change in the reflectance, a photo-sensor 29D is provided outside of the furnace 1D to receive a light such as a He-Ne laser beam which is emitted from a light source 26D and reflected at the reflector 25. Sealed windows 27D and 28D are formed in the wall of the furnace 1D for directing the light into and out of the furnace 1D. The photo-sensor 29D is coupled to a like computer forming a like control system of FIGS. 4 and 5 for controlling the furnace temperature as well as the supplying amounts of the air and the inert gas based upon the monitored reflectance. That is, as shown in FIG. 12, the debinding process is controlled in the like manner as in the first embodiment to initially supply only the air as forming the surrounding gas while raising the furnace temperature at a high increasing rate. Then, the inert gas i.e., nitrogen is supplied in a less amount to form the surrounding gas with air. When the heat-treatment proceeds to a point where the reflectance Ref is lowered remarkably, a control is made to lower the flow rate of the air and instead to increase the flow rate of the inert gas in such a manner as to increase the total amount of the air and the inert gas being supplied to the furnace 1D with attendant decrease in oxygen concentration. Thus, the furnace 1D is controlled to continue the defect-free debinding of the ceramic product in the manner as discussed hereinbefore. Also in this embodiment, when the process comes to a final stage where the ceramic product is sufficiently removed of the organic binder, it is again controlled to increase the supplying amount of the air and decreasing that of the inert gas for completing the debinding in the air-rich environment.

Sixth embodiment

Figure 13:
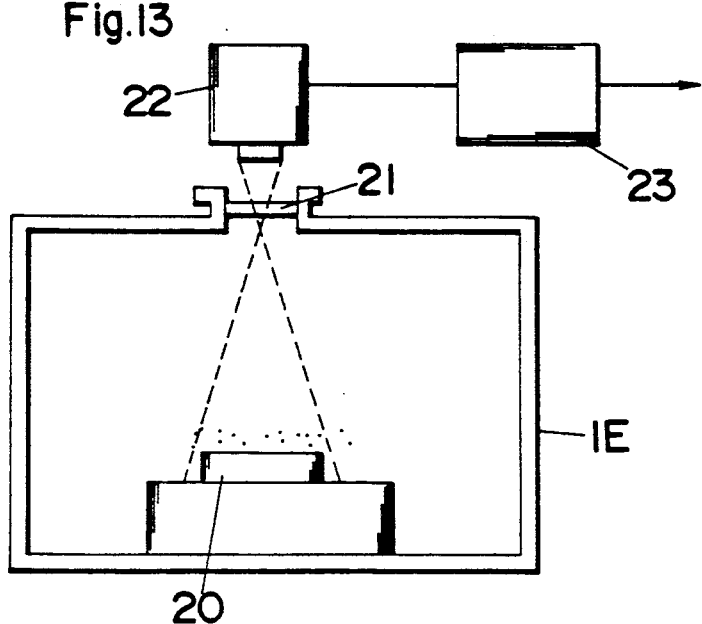
FIG. 13 a schematic view of a furnace utilized in a debinding process in accordance with a sixth embodiment of the present invention, the furnace provided with a device for monitoring color change of the ceramic product in view of its yellow deviation.

A sixth embodiment of the present invention is contemplated to observe the ceramic product itself for evaluating the condition thereof rather than to examine the cracked gas generated therefrom. To this end, a television camera 22 is provided to take a color image of the product through a sealed window 21 in the upper wall of a furnace 1E, as shown in FIG. 13. The camera 22 is coupled to a color-analyzer 23 which outputs a color signal to a computer. The computer is of the type as utilized in the system of FIGS. 4 or 5 and coupled through suitable interfaces to control the furnace temperature as well as the supplying amounts of the air and the inert gas. The information fed by the color signal to the computer is a yellow deviation ΔYI of the ceramic product which is defined as an instantaneous yellow intensity (YI) minus an initial yellow intensity (Y₀), as expressed by:

$$\Delta YI = YI - YI0;$$

where YI is obtained from tristimulus values of color A, B, and C and calculated from the following equation:

$$YI = 100 (1.28 A - 1.06 C)/B.$$

Figure 14:
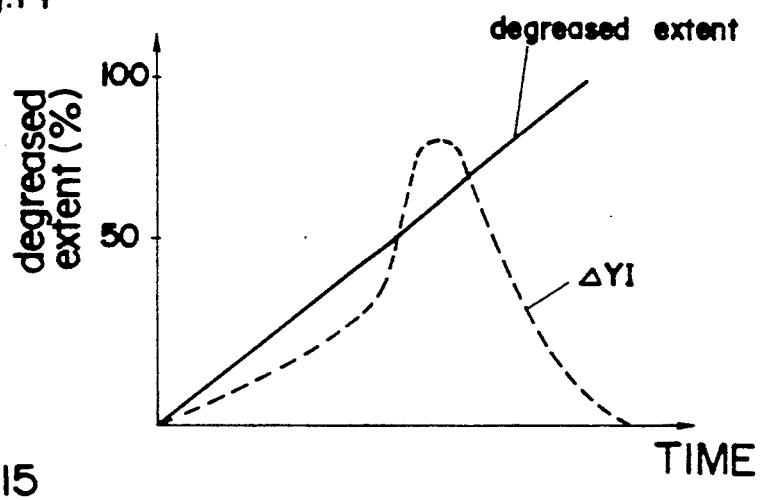
FIG. 14 is a graph showing a relationship between monitored yellow deviation and debinded extent of the ceramic product.

The yellow deviation YI thus defined is found to be well related to the debinded extent of the ceramic, as shown in FIG. 14. Based upon thus obtained yellow deviation YI, the computer controls the furnace temperature and the supplying amounts of the air and the inert gas.

Figure 15:
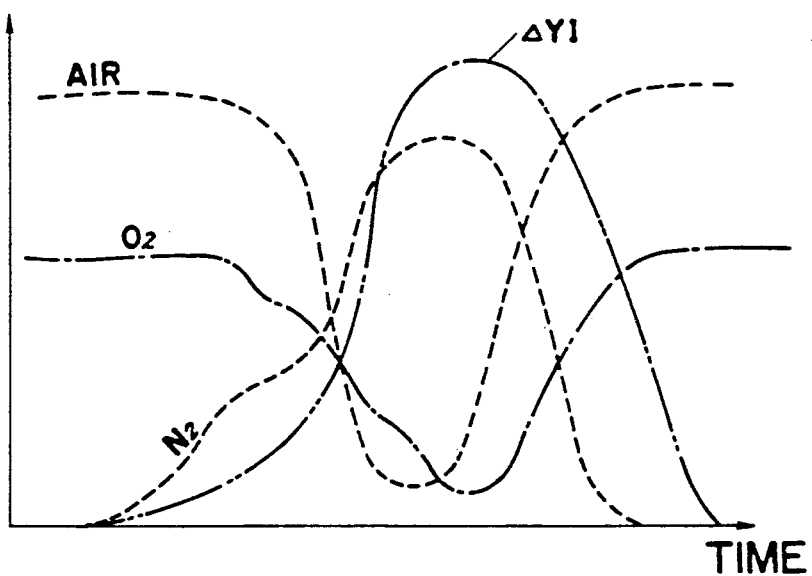
FIG. 15 is a graph showing changes in several environmental parameters seen in the debinding process of the sixth embodiment.

In operation, the debinding process starts heating the furnace temperature at a high increasing rate while supplying only the air to form the surrounding gas, as shown in FIG. 15. Shortly thereafter, the inert gas, i.e., nitrogen is supplied in a less amount to form the surrounding gas with air. When the furnace is heated to an elevated temperature at which the organic binder becomes decomposed, the ceramic product begins discolored which is recognized by the computer as a corresponding yellow deviation YI and therefore as indicative of the debinded extent. When the debinded extent reaches to a predetermined level, the computer responds to reduce the temperature increasing rate, and at the same time to lower the flow rate of the air and instead to increase the flow rate of the inert gas $N_2$ in such a manner as to increase the total amount of the air and the inert gas being supplied to the furnace with attendant decrease in oxygen concentration. Thus, the cracking gas remaining around or in the surface of the ceramic product can be rapidly flown away to facilitate the removal of the cracked gas or the organic binder from within the ceramic product without leaving therein a swelling defect. Also at this occurrence, the ceramic product is cooled to some extent by contact with the fresh surrounding gas and is exposed to that surrounding gas with a reduced oxygen concentration, whereby restraining an abrupt decomposition of the organic binder which would otherwise lead to the fracture. When the process comes to a final stage where the ceramic product is sufficiently removed of the organic binder, it is again controlled to increase the supplying amount of the air and decrease that of the inert gas for completing the debinding in the air-rich environment.

In the above fourth to sixth embodiments in which the CO concentration of the cracked gas is not necessarily monitored, however, the CO concentration may be monitored for effecting more sophisticated control in cooperation with the individual monitored information.

Further, instead of using the inert gas for reducing the oxygen concentration, it is also possible to remove oxygen from the surrounding air by absorption or any other manner such that only the air can be utilized to form the surrounding gas and no inert gas is required over the entire debinding process.

What is claimed is:

1. A ceramic product debinding process for removing an organic binder contained in said ceramic product by heating said ceramic product within a furnace in the presence of a surrounding gas containing oxygen, said process comprising:
   monitoring a carbon monoxide concentration of a cracked gas being generated by thermal decomposition of said organic binder; and
   controlling, based upon said monitored carbon monoxide concentration of the cracked gas, a temperature gradient at which said ceramic product is heated as well as an amount of said surrounding gas being supplied to said furnace.

2. A process as set forth in claim 1, wherein said ceramic product is formed from a mixture of ceramic powder and the organic binder consisting essentially of carbon, hydrogen and oxygen.

3. A process as set forth in claim 1, wherein the amount of oxygen contained in said surrounding gas is controlled to be reduced while increasing the total amount of said surrounding gas when said carbon monoxide concentration exceeds a predetermined level.

4. A process as set forth in claim 1, wherein said surrounding gas is substantially composed of air.

5. A process as set forth in claim 1, wherein the amount of said surrounding gas is controlled in such a manner as to maintain the carbon monoxide concentration at a predetermined level.

6. A process as set forth in claim 4, wherein the amount of said surrounding gas is controlled in such a manner as to maintain the carbon monoxide concentration at a predetermined level.

7. A ceramic product debinding process for removing an organic binder contained in said ceramic product by heating said ceramic product within a furnace in the presence of a surrounding gas, said process comprising:
   monitoring a change in transmissivity of light passing through the cracked gas being generated by thermal decomposition of said organic binder; and
   controlling, based upon said monitored change in said transmissivity, a temperature gradient at which said ceramic product is heated as well as an amount of said surrounding gas being supplied to said furnace.

8. A ceramic product debinding process for removing an organic binder contained in said ceramic product by heating said ceramic product within a furnace in the presence of a surrounding gas, said furnace provided with a reflector which is exposed to a cracked gas being generated by thermal decomposition of said organic binder such that said cracking gas deposits on said reflector to vary reflectance of light therefrom, said process comprising:
   monitoring said reflectance of light as indicative of the condition of said cracked gas; and
   controlling, based upon said monitored reflectance of light, a temperature gradient at which said ceramic product is heated as well as an amount of said surrounding gas being supplied to said furnace.

9. A ceramic product debinding process for removing an organic binder contained in said ceramic product by heating said ceramic product within a furnace in the presence of a surrounding gas, said process comprising:
   monitoring a color change of said ceramic product as indicative of a debinded extent thereof; and
   controlling, based upon said monitored color change, a temperature gradient at which said ceramic product is heated as well as an amount of said surrounding gas being supplied to said furnace.

* * * * *